Figure 1:
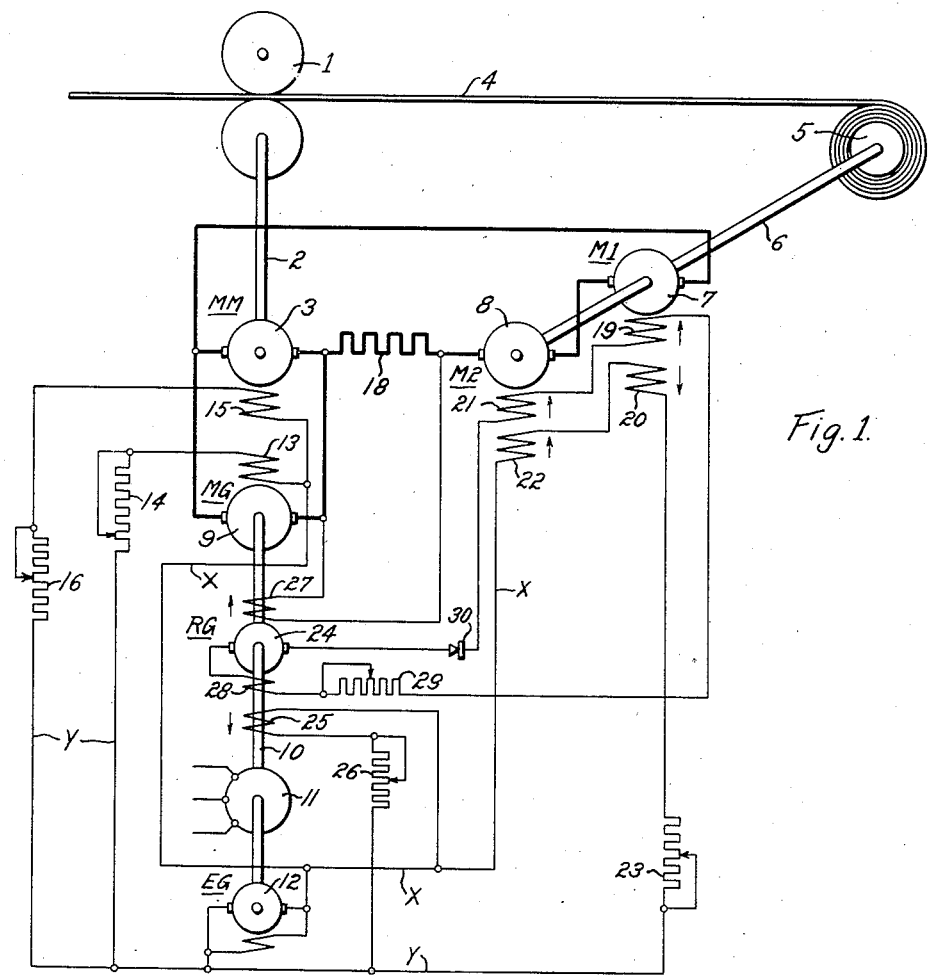

Nov. 16, 1948.   W. R. HARDING   2,454,166
PLURAL ELECTRIC MOTOR CONTROL SYSTEM
Filed June 16, 1945

WITNESSES:

INVENTOR
William R. Harding.
BY
Paul C. Friedemann
ATTORNEY

Patented Nov. 16, 1948

2,454,166

UNITED STATES PATENT OFFICE 2,454,166

PLURAL ELECTRIC MOTOR CONTROL SYSTEM

William R. Harding, Export, Pa., assignor to Westinghouse Electric Corporation, East Pittsburgh, Pa., a corporation of Pennsylvania Application June 16, 1945, Serial No. 599,831

5 Claims. (Cl. 318—48)

My invention relates to control systems for operating electric motors at adjustable speed and, in one of its aspects, to motor control systems for reel or winder drives in which the winding speed is controlled to maintain a desired tension in the sheet, strip or strand material to be wound.

In a customary type of such systems, the speed is controlled by varying the field excitation of the driving motor. In reel drives, for instance, the motor field is strengthened as the reel diameter builds up so that the motor speed is gradually reduced in order to maintain the tension in the material at a substantially constant value. In the known systems, the speed variation by field control is limited to a speed range of about six to one. This corresponds in reel drives to a maximum build-up ratio of the reel of five to one, and to a smaller ratio in large-size winding equipment.

It is an object of my invention to devise variable speed drives with field-controlled machines which afford a speed adjustment over a considerably larger range than in the known systems.

Another object of the invention is the provision of an electric winder or reel drive capable of maintaining a desired tension in the winding material while operating with a build-up ratio considerably larger than in the known field-controlled reel drives.

Having these objects in mind, and in accordance with my invention, I provide a variable speed drive with two rotary direct-current machines whose armatures are mechanically interconnected and disposed for connection to the winder or other machine to be driven. The two armatures are electrically connected to a current source. Each of the two machines has separately excited field-winding means whose excitation is controlled differently in such a manner that both machines operate as driving motors when the system is set for low speed, while at higher speeds one machine acts as a booster relative to the other machine and is driven by the other machine. As a result, the obtainable range of speed variation of the drive is increased far beyond the customary limit, for instance, to twelve to one.

According to another feature of the invention, I secure the above-mentioned field control of the two machines by providing each with two field windings which are connected for cumulative action in one machine and for differential action in the other machine. One field winding of each machine is supplied with normally constant excitation, while the remaining field windings receive variable excitation under control by suitable adjusting or regulating means. An increase in variable excitation has the effect of strengthening the resultant field in the machine that has the cumulatively acting windings and of weakening or reversing the resultant field excitation of the other machine. Hence, the former can be made to run as a motor at variable speed depending upon the strength of its field, and the latter machine will simultaneously operate as a booster or as a motor also depending on its field condition.

It is also a feature of my invention to provide control means for varying the field excitation of the two machines automatically in dependence upon an operating condition to be kept constant. More specifically, I provide a regulating generator whose armature furnishes the variable field excitation for the two mechanically coupled machines and whose field is controlled in dependence upon the load current in the armature circuit of one or both of the rotary machines.

According to another feature of my invention, I correlate the variable speed drive of a winder with a selective constant speed of a calender, rolling mill, roll press, or other associated machinery from which the material to be wound is taken, by supplying the two mechanically coupled machines of the winder with armature current from a variable voltage generator which feeds also the drive motor of the associated machinery. This affords a winding operation at a winding tension whose value remains constant regardless of changes in the operating speed of the machinery associated with the winder and whose winding range remains increased, for instance to a reel diameter ratio of more than 5 to 1, within the entire available speed range of the machinery.

Figure 2:
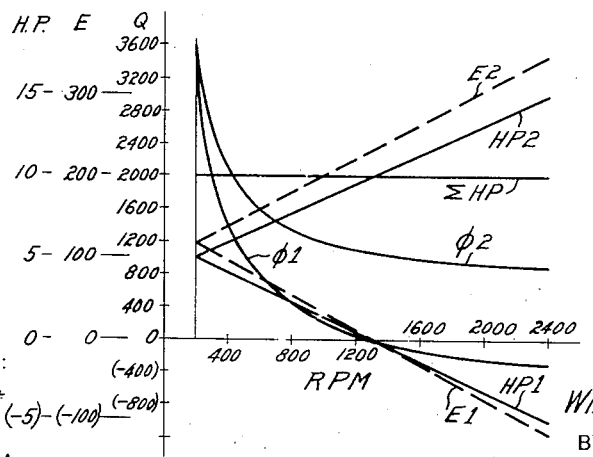

These and other objects and features of the invention will be apparent from the following description of the embodiment illustrated in the drawing, in which:

Figure 1 shows diagrammatically a control system for operating a winder at variable speed and in correlation to the speed of associated machinery from which the material to be wound is taken; and Fig. 2 is explanatory and shows a group of correlated characteristics representing the performance of the system according to Fig. 1.

In Figure 1, a rolling mill, a calender, or other machinery for fabricating a strand or sheet material is denoted by the numeral 1. This machinery is driven by a suitable transmission, here represented by a shaft 2, from the armature 3 of a main motor MM. The material to be wound passes from the machinery 1 onto a core-type winder 5 which is driven by means of a transmission, here also represented as a shaft 6. Mechanically connected with this transmission are two rotary direct-current machines M1 and M2, whose respective armatures 7 and 8 are mounted on a common shaft, or otherwise mechanically coupled with each other.

The armatures 3, 7 and 8 are connected in a common load circuit which receives its energization from the armature 9 of a main generator MG. The shaft 10 of armature 9 is driven by a constant speed motor 11 and carries also the armature 12 of an exciter generator EG. When in operation, the exciter generator supplies substantially constant direct current to the mains denoted by X and Y, respectively.

The field winding 13 of main generator MG is connected across mains X and Y through a speed-adjusting rheostat 14. The field winding 15 of motor MM is likewise connected across mains X and Y, a calibrating rheostat 16 being preferably interposed. The voltage generated by the main generator MG and, hence, the speed of motor MM can be varied by adjusting the rheostat 14. The traveling speed of the strip material 4 is thus substantially proportional to the generator voltage. The armature current of machines M1 and M2 is also supplied from the main generator MG. Consequently, the behavior of the two machines M1 and M2 is generally correlated to the speed adjustment of the machinery 1. The armature current passes also through a series-connected resistor 18 of the load circuit which serves to measure the load current in order to control the driving speed of the winder in the manner described presently.

The machine M1 is equipped with two separately excited field windings 19 and 20 which are so connected that they operate differentially relative to each other and which are so rated that the resultant field excitation of machine M1 changes its direction, when the ratio of the voltages imposed on the two field windings passes through a given value. The machine M2 is equipped with two separately excited field windings 21 and 22 which are connected for cumulative operation. When the two field windings of the respective machines M1 and M2 are energized, the machine M2 will always operate as a motor for driving the winder 5 in the proper direction, while the machine M1 functions either as a drive motor in support of the driving effort developed by machine M2, or as a generator which derives its mechanical input energy from the machine M2 and acts as a booster in the armature circuit of machine M2. Windings 20 and 22 are series-connected between the exciter mains X and Y. A calibrating resistor 23 is preferably inserted in this series connection. The windings 19 and 21 receive excitation from the armature 24 of a regulating generator RG. The armature 24 is mounted on the shaft 10 of the constant speed motor 11 so that, during the operation of the system, the output voltage of the regulating generator depends only upon its resultant field excitation. The regulating generator is equipped with a pattern field winding 25. This winding is connected across the constant voltage mains X and Y through a calibrating rheostat 26. During the operation of the system, the excitation of winding 25 need not be changed. The regulating generator has further a pilot winding 27 which acts differentially with respect to the pattern field winding 25, and is so rated as to be balanceable relative thereto. Winding 27 is connected across the above-mentioned resistor 18 in the armature circuit of machines M1 and M2. Consequently, the excitation of winding 27 varies in accordance with the current supplied from the main generator MG to the armatures 7 and 8 of machines M1 and M2. A self-energized field winding 28 is connected in series with a calibrating rheostat 29 between the output brushes of armature 24 and the field windings 19 and 21 of machines M1 and M2, respectively, a rectifier 30 being inserted in this connection in order to secure a flow of current in the proper direction through the windings 19 and 21. The resistance in the just-mentioned circuit is adjusted by means of the rheostat 29 so that the resistance line of the self-excited regulator field winding 28 is approximately coincident with the no-load saturation characteristic of this generator. As a result, the field winding 28 represents an amplifying feed-back device which takes some of the output energy of this generator in order to thereby produce an increase in the same output energy. This feed-back effect has a sustaining tendency on the output voltage without imposing a forcing effect on this voltage. That is, the output voltage of the regulating generator RG, and hence the excitation of the field windings 19 and 21, is determined merely by the ratio of excitation imposed on the pattern field winding 25 and the pilot field winding 27.

The operation of the system as a whole will be more readily understood from a reference to numerical examples. It may, therefore, be assumed that the illustrated winder drive is rated for 10 horsepower and a speed variable between 200 and 2400 R. P. M. For this rating, the two machines M1 and M2 may consist of customary direct-current motors each being normally rated for 10 horsepower, 400 to 1600 R. P. M. and 230 volts. Machine M1 has its field winding 20 designed so as to produce an armature voltage of 115 volts when running at a speed of 2400 R. P. M. The field winding 22 in machine M2 is rated for producing an armature voltage of 345 volts at the speed of 2400 R. P. M.

When the reel is started empty, the machine M2 will run as a motor at 2400 R. P. M. Machine M1 starts running as a generator and produces an armature voltage of 115 volts. Assuming the voltage of the main generator to be 230 volts, the total voltage across the armaure of machine M1 is then 345 volts. These operating conditions are apparent from the diagram of Fig. 2, in which the curve E1 represents the armature voltage of machine M1, curve E2 the armature voltage of machine M2, curves HP1 and HP2 the horsepower of machines M1 and M2, respectively, and curves φ1 and φ2 the magnetic flux in the two machines, respectively; while the straight-line marked Σ HP denotes the resultant driving effort of the two interconnected machines M1 and M2, this driving effort being constant at 10 horsepower. Under the just-mentioned starting conditions at a speed of 2400 R. P. M., the two differential field windings 25 and 27 of the regulating generator RG are balanced against each other, due to a properly selected adjustment of the rheostat 26. Consequently, the output voltage of generator RG is at first zero, so that the field windings 19 and 21 on machines M1, M2, respectively, receive no excitation. Hence, machine M2 functions as a motor and develops 15 horsepower of which 5 horsepower are needed for driving machine M1 which now acts as a booster.

As the reel on winder 5 builds up, the tension in the material increases so that the armature current of motors M1 and M2 increases accordingly. The rising load results is an increased excitation of the pilot field winding 27 in generator RG. As a result, the balance between windings 25 and 27 is disturbed in the direction necessary to generate a regulator voltage in armature 24 which forces a field current through the windings 19 and 21 of machines M1 and M2, respectively. This reduces the boosting voltage generated across armature 7 in machine M1 and strengthens the resultant field winding of machine M2. This, in turn, decreases the speed of the winder and causes a corresponding decrease in load current. As the reel builds up to a further extent, the currents passing through field windings 19 and 21 are increased accordingly, with the effect of maintaining the load current through resistor 18 substantially constant. As a result, the tension in the material 4 is also kept at a constant value due to the automatic speed reduction of the winder drive.

During the just-mentioned performance, the machine M1 will pass through a condition in which the two field windings 19 and 20 receive balanced excitation so that the booster voltage across armature 7 becomes zero. In this condition, the total driving power developed by machine M2 is applied to the winder. When, during the further operation, the current in winding 19 increases beyond the balance value, the machine M1 starts operating as a motor so that, from then on, both machines M1 and M2 provide the driving effort for the winder. When the reel of material has built up to the desired maximum value, both machines operate at 115 volts armature voltage at 200 R. P. M.

With machines as exemplified in the foregoing, a speed range of twelve to one can be obtained, corresponding to a reel built up of about 10 to 1. It will be understood, however, that the electric interconnection and rating of the two mechanically-connected machines can be varied to suit the requirements or desiderata of each particular application. It will further be obvious to those skilled in the art, upon a study of the foregoing disclosure, that the invention is not necessarily limited to the use of a regulating generator, as described in the foregoing, but can also be realized by means of other control or regulating devices in the field circuit of the two mechanically-connected electric machines; although I consider it preferable to apply a regulating generator of the amplifying type, especially in conjunction with a main generator for supplying variable voltage to the drive. In view of this possibility of modifying the invention, without departing from its principles, and within the scope of the essential features set forth in the claims annexed hereto, this specification should be understood as explanatory and illustrative rather than in a limiting sense.

I claim as my invention:

1. A variable speed drive, comprising direct-current supply means, two rotary direct-current machines having respective armatures mechanically connected with each other and being each provided with two field windings which relative to each other, are cumulative in one machine and differential in the other, a circuit including said armatures in series connection to each other, said circuit being connected to said current-supply means to be energized by the latter, circuit means connected to one field winding of each machine to provide substantially constant excitation therefor, and control means connected to said armature circuit to be controlled in dependence upon the current flowing in said circuit and being connected to said other field winding of each machine to provide control excitation therefor, whereby the resultant field excitation of one machine is lowered when that of the other machine is raised so that both machines operate as drive motors when said control means are in condition for low speed operation while one machine operates as a booster and is driven by the other machine when said control means are in condition for high speed operation.

2. A variable speed drive, comprising direct-current supply means, two rotary direct-current machines having respective armatures mechanically connected with each other and being each provided with two field windings which, relative to each other, are cumulative in one machine and differential in the other machine, an armature circuit including said armatures in series connection to each other, said circuit being connected to said current-supply means to be energized thereby, circuit means connected to one field winding of each of said machines to provide substantially constant excitation therefor, a regulating generator having an armature connected to said other field windings to provide variable excitation therefor and having a control-field winding for varying said excitation so as to lower the resultant field in one machine when raising it in the other, and current-responsive circuit means disposed between said control-field winding and said armature circuit for causing said regulating generator to control the speed of said two machines for maintaining a substantially constant current in said armature circuit, whereby said two machines function both as drive motors when operating at low speed while said machine having said cumulative windings functions as a booster and is driven by the other machine when operating at high speed.

3. A system for driving a winder in correlation to associated machinery, comprising current-supply means for providing a direct-current voltage varying substantially in accordance with the speed of the associated machinery, two rotary direct-current machines having respective armatures for connection with the winder to be driven and being each provided with two field windings which, relative to each other, are cumulative in one machine and differential in the other machine, said armatures being series-connected to said current-supply means, circuit means connected to one field winding of each machine to provide substantially constant excitation therefor, a regulating generator having an armature connected to said other field winding of each machine to provide control excitation therefor whereby the resultant field excitation of one machine is lowered when that of the other machine is raised, and means for energizing said control-field winding in dependence upon the armature current of said machines whereby said machines are both caused to function as drive motors for low speed operation of the winder, while one of said machines functions as a booster and is driven by the other machine for high speed operation of the winder.

4. A system for driving a winder in correlation to associated machinery, comprising a direct-current motor for driving the machinery, two rotary direct-current machines having respective armatures arranged in electric series connection and disposed for connection to the winder, a main generator electrically connected to said motor and to said series connection for providing variable voltage therefor, each of said two machines having two field windings which, relative to each other, are cumulative in one machine and differential in the other machine, said armatures being series-connected to said current-supply means, circuit means connected to one field winding of each machine to provide substantially constant excitation therefor, a regulating generator having an armature connected to said other field winding of each machine to provide control excitation therefor whereby the resultant field excitation of one machine is lowered when that of the other machine is raised, and circuit means connecting said control-field winding with said armature series connection for energizing said control-field winding in accordance with the armature current traversing said machine armatures, whereby said machines are both caused to function as drive motors for low speed operation of the winder, while one of said machines functions as a booster and is driven by the other machine for high speed operation of the winder.

5. A system for driving a winder in correlation to associated machinery, comprising a direct-current motor for driving the machinery, two rotary direct-current machines having respective armatures arranged in electric series connection and disposed for connection to the winder, a main generator having an armature electrically connected to said series connection for providing variable voltage therefor and having a field winding for controlling said voltage in order to thereby adjust the speed of the machinery, adjustable circuit means connected to said generator-field winding to provide controlled excitation therefor, each of said two machines having two field windings which, relative to each other, are cumulative in one machine and differential in the other machine, said armatures being series-connected to said current-supply means, circuit means connected to one field winding of each machine to provide substantially constant excitation therefor, a regulating generator having an armature connected to said other field winding of each machine to provide control excitation therefor whereby the resultant field excitation of one machine is lowered when that of the other machine is raised, circuit means connecting said control-field winding with said armature series connection for energizing said control-field winding in accordance with the armature current traversing said machine armatures, and means for driving said armatures of said main generator and said regulating generator at substantially constant speed.

WILLIAM R. HARDING.

REFERENCES CITED

The following references are of record in the file of this patent:

UNITED STATES PATENTS

| Number | Name | Date |
|---|---|---|
| 1,764,349 | Robinson | June 17, 1930 |
| 1,822,759 | Umansky | Sept. 8, 1931 |
| 1,912,411 | Stansbury | June 6, 1933 |
| 2,182,631 | Kenyon | Dec. 5, 1939 |
| 2,342,790 | Cook | Feb. 29, 1944 |